(12) United States Patent
Prusha et al.

(10) Patent No.: US 11,828,380 B2
(45) Date of Patent: Nov. 28, 2023

(54) VALVE BODIES AND METHODS OF MANUFACTURING THE SAME

(71) Applicant: Fisher Controls International LLC, Marshalltown, IA (US)

(72) Inventors: Andrew M. Prusha, Marshalltown, IA (US); Lisa M. Miller, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/384,036

(22) Filed: Jul. 23, 2021

(65) Prior Publication Data

US 2023/0028518 A1 Jan. 26, 2023

(51) Int. Cl.
*B23P 5/00* (2006.01)
*F16K 3/24* (2006.01)
*B23P 15/00* (2006.01)
*B33Y 80/00* (2015.01)
*B33Y 10/00* (2015.01)
*F16K 3/316* (2006.01)

(52) U.S. Cl.
CPC .............. *F16K 3/24* (2013.01); *B23P 15/001* (2013.01); *B33Y 10/00* (2014.12); *B33Y 80/00* (2014.12); *F16K 3/316* (2013.01)

(58) Field of Classification Search
CPC ..................................................... B23P 15/001
See application file for complete search history.

(56) References Cited

U.S. PATENT DOCUMENTS

| | | |
|---|---|---|
| 3,506,242 A | 4/1970 | Aunspach |
| 3,892,384 A | 7/1975 | Myers |
| 3,961,770 A | 6/1976 | Wrasman |
| 4,004,776 A | 1/1977 | Stender |
| 4,064,003 A | 12/1977 | Newton |
| 4,221,037 A | 9/1980 | Seger |
| 4,249,574 A | 2/1981 | Schnall et al. |

(Continued)

FOREIGN PATENT DOCUMENTS

| | | |
|---|---|---|
| DE | 1191646 | 4/1965 |
| DE | 102015202417 | 8/2016 |

(Continued)

OTHER PUBLICATIONS

United States Patent and Trademark Office, "Non-Final Office Action", issued in connection with U.S. Appl. No. 15/423,087, dated Mar. 7, 2018, (12 pages).

(Continued)

*Primary Examiner* — Sarang Afzali
(74) *Attorney, Agent, or Firm* — HANLEY, FLIGHT & ZIMMERMAN, LLC (57) ABSTRACT

Valve bodies and methods of manufacturing the same are disclosed. An example method of manufacturing a valve body includes forming a first duct extending from a first side of the valve body, forming a first wall in the valve body at least partially protruding from a surface of the first duct, the first wall defining a chamber, forming one or more openings in the first wall to fluidly couple the chamber to the first duct, and forming a second duct extending from a second side of the valve body opposite the first, the second duct fluidly coupled to the chamber.

13 Claims, 5 Drawing Sheets

(56) References Cited

U.S. PATENT DOCUMENTS

| | | | |
|---|---|---|---|
| 4,513,778 | A | 4/1985 | Vadasz |
| 4,611,374 | A | 9/1986 | Schnelle et al. |
| 5,304,336 | A | 4/1994 | Karlsson et al. |
| 5,421,718 | A | 6/1995 | Karlsson et al. |
| 6,032,692 | A | 3/2000 | Volz |
| 6,189,816 | B1 * | 2/2001 | Stier .................. F02M 61/168 29/890.132 |
| 7,832,425 | B2 | 11/2010 | Wears et al. |
| 8,066,258 | B2 | 11/2011 | Perrault et al. |
| 9,995,400 | B2 * | 6/2018 | Richardson .............. F16K 1/32 |
| 2002/0017327 | A1 * | 2/2002 | Kawaai ................. F16K 3/34 137/625.3 |
| 2002/0117646 | A1 | 8/2002 | Jessberger et al. |
| 2003/0209682 | A1 | 11/2003 | Jessberger et al. |
| 2006/0049375 | A1 * | 3/2006 | Gossett ............... F16K 25/005 251/357 |
| 2006/0180783 | A1 | 8/2006 | Tackes et al. |
| 2008/0053544 | A1 | 3/2008 | Wears et al. |
| 2009/0183790 | A1 | 7/2009 | Moore |
| 2010/0115772 | A1 * | 5/2010 | Salisbury ................. B24B 5/06 29/890.122 |
| 2012/0060952 | A1 | 3/2012 | Lovell et al. |
| 2013/0221261 | A1 | 8/2013 | Otobe et al. |
| 2013/0255802 | A1 | 10/2013 | Minnock |
| 2015/0059874 | A1 | 3/2015 | Loveless et al. |
| 2016/0208930 | A1 | 7/2016 | Bell et al. |
| 2016/0331412 | A1 | 11/2016 | Biedermann et al. |
| 2017/0051676 | A1 | 2/2017 | Geiger |
| 2018/0216738 | A1 | 8/2018 | Gabriel et al. |
| 2018/0216745 | A1 | 8/2018 | Gabriel et al. |
| 2019/0353265 | A1 * | 11/2019 | Gabriel .................. F16K 27/00 |

FOREIGN PATENT DOCUMENTS

| | | |
|---|---|---|
| EP | 0482272 | 4/1992 |
| EP | 0842074 | 5/1998 |
| EP | 1200721 | 5/2002 |
| EP | 2616719 | 7/2013 |
| EP | 2639323 | 9/2013 |
| EP | 2851587 | 3/2015 |
| FR | 1570052 | 6/1969 |
| FR | 2559096 | 8/1985 |
| JP | H03208617 | 9/1991 |
| WO | 9707002 | 2/1997 |
| WO | 0109498 | 2/2001 |
| WO | 2010116221 | 10/2010 |
| WO | 2012037142 | 3/2012 |
| WO | 2015167422 | 11/2015 |
| WO | 2016128388 | 8/2016 |

OTHER PUBLICATIONS

United States Patent and Trademark Office, "Final Office Action", issued in connection with U.S. Appl. No. 15/423,087, dated Jun. 14, 2018, (15 pages).

United States Patent and Trademark Office, "Non-Final Office Action", issued in connection with U.S. Appl. No. 15/423,087, dated Sep. 13, 2018, (15 pages).

United States Patent and Trademark Office, "Final Office Action", issued in connection with U.S. Appl. No. 15/423,087, dated Feb. 28, 2019, (12 pages).

Fisher Controls, "Instruction Manual: Design E Valve Bodies, ANSI Class 1500 & 2500," Form 2573, Jan. 1980 (20 pages).

United States Patent and Trademark Office, "Final Office Action", issued in connection with U.S. Appl. No. 15/423,133, dated Mar. 27, 2018, (13 pages).

Thingiverse (by User: "vsystemluba") "Ball inside Sphere," Thingiverse, retrieved from [https://www.thingiverse.com/thing:140173] on Aug. 17, 2018, published Aug. 26, 2013, (1 page).

Vaidya et al., "Optimum Support Structure Generation for Additive Manufacturing using Unit Cell Structures and Support removal Constraint," Procedia Manufacturing, vol. 5., 44th Proceedings of the North American Manufacturing Research Institution of SME, 2016 (17 pages).

United States Patent and Trademark Office, "Final Office Action", issued in connection with U.S. Appl. No. 15/423,133, dated Oct. 4, 2018, (17 pages).

Machine Translation of DE1191646, retrieved on Sep. 30, 2018 from Espacenet (4 pages).

International Searching Authority, "International Search Report and Written Opinion", issued in connection with International Application No. PCT/US2018/014175, dated Jun. 14, 2018 (13 pages).

International Searching Authority, "International Search Report and Written Opinion", issued in connection with International Application No. PCT/US2018/014181, dated Apr. 26, 2018 (14 pages).

United States Patent and Trademark Office, "Non-Final Office Action", issued in connection with U.S. Appl. No. 15/423,133, dated Jan. 28, 2019, (15 pages).

United States Patent and Trademark Office, "Final Office Action", issued in connection with U.S. Appl. No. 15/423,133, dated Jun. 19, 2019, (15 pages).

\* cited by examiner

VALVE BODIES AND METHODS OF MANUFACTURING THE SAME

FIELD OF THE DISCLOSURE

This disclosure relates generally to control valves and, more particularly, to valve bodies and methods of manufacturing the same.

BACKGROUND

Process control systems, such as those used in oil production, refining, and power generation include control valves to control flow of process control fluids. A control valve includes a body and trim components such as a cage and a seat through which fluid flows.

SUMMARY

An example method disclosed herein includes forming a first duct extending from a first side of the valve body. The example method includes forming a first wall in the valve body at least partially protruding from a surface of the first duct. The first wall defines a chamber. The example method includes forming one or more openings in the first wall to fluidly couple the chamber to the first duct. The example method includes forming a second duct extending from a second side of the valve body opposite the first side. The second duct is fluidly coupled to the chamber.

An example valve body disclosed herein includes a first duct extending from a first side of the valve body to a first wall. The first wall at least partially protrudes relative to a surface of the first duct. The example valve body includes a second duct extending from a second side of the valve body opposite the first side. The example valve body includes a cage defining a chamber between the first duct and the second duct. The cage includes the first wall and a second wall protruding from the first wall. The first wall includes a first opening to fluidly coupled the chamber to the first duct. The second wall includes an opening to fluidly couple the chamber to the second duct.

An example method disclosed herein includes forming a cage within a passageway defined in the valve body. The cage defines a first portion of the passageway in fluid connection with a second portion of the passageway and a third portion of the passageway. The cage includes a wall protruding from a surface that defines the second portion of the passageway. The example method includes forming a plug seat protruding from the wall.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Process control systems can include control valves having sealing capabilities to control operations, such as those associated with oil production, refining, and/or power generation, through fluid flow. A control valve includes a body and an assembly that is coupled to the body to control the flow of fluid therethrough. Such assemblies typically include numerous trim components that are inserted into the body of the control valve during a valve assembly process. Examples of such trim components include a bonnet, a bonnet gasket, a shim gasket, a spiral wound gasket, a post or a cage, and a plug, among other components. Some of the trim components guide movement of the plug to prevent or allow the fluid to flow through the valve body. However, leakage of the fluid can occur between the valve body and the trim components inserted therein. Thus, the control valve may include other trim components (e.g., gaskets) to seal leakage paths between the valve body and the fluid control trim components. However, proper loading and/or assembly of such trim components gives rise to numerous manufacturing and assembly complexities.

Some known control valves include a post that is coupled to a bonnet and inserted into the valve body. The post can be positioned around the valve stem to guide movement of the stem and, in turn, movement of the valve plug coupled to an end of the stem. Some other known control valves include a cage coupled to the bonnet and inserted into the valve body. In such examples, the cage contains the valve plug to guide movements thereof. However, control valves including cages to guide the valve plug can be difficult to manufacture because of complexities in the design of the cages. Thus, the costs of manufacturing valve components and/or assembling valves including cages to guide the plug are increased. Furthermore, when the valve plug, the cage or the post, and/or other trim components (e.g., gaskets) break or wear from usage, repair of the components of the assembly may be difficult due to the intricate nature of the assembly and loading.

Disclosed herein are example control valves including valve bodies with one or more components to guide a plug of the valve formed from or integral with the valve body. In examples disclosed herein, fluid ducts are formed in the valve body. For example, a first duct can be defined in the body to serve as a fluid inlet and a second duct can be defined in the body to provide a fluid outlet.

In examples disclosed herein, the valve body includes a cage formed between the first duct and the second duct. In some examples disclosed herein, openings are formed in wall(s) of the valve body to form the cage. The cage defines a chamber fluidly coupled to the first duct and the second duct of the valve body. In examples disclosed herein, the valve body includes a plug seat proximate the cage. In some examples, the plug seat is formed in and/or extends from one or more of the walls of the valve body.

In examples disclosed herein, the cage extends to and/or is aligned with an orifice defined in the valve body. The orifice can receive a plug removably couplable to the valve body. In examples disclosed herein, the cage guides movements of the plug relative to the plug seat. For instance, the plug can be positioned to rest against the plug seat or spaced apart from the plug seat to control a flow of fluid through the first or second duct.

Example valve bodies disclosed herein have a reduced number of trim components as compared to valve bodies that include trim components removably coupled to the valve body. For instance, in examples disclosed herein, a separate post or cage is not used to guide the plug. Rather, in examples disclosed herein, the integrally formed cage in the valve body serves as a guide for the plug. Further, example valve bodies disclosed herein eliminate or substantially reduce a quantity of gaskets inserted between trim components and the valve body because components such as the cage are integrally formed with the valve body. As a result, control valves including the example valve bodies disclosed herein can be manufactured at reduced costs because of the reduction in components such as the gaskets. Further, the reduced number of trim components can reduce a load (e.g., a bolt load) needed to couple the fluid control assembly (e.g., bonnet) to the valve body. Moreover, fluid leakage in the valve body is minimized or otherwise reduced due to the reduced number of trim components and/or couplings between trim components and, thus, reduced number locations in the valve body for fluid to leak.

In some disclosed examples, the valve body and/or the components thereof are formed via additive manufacturing. In some examples disclosed herein, the valve body is formed via sand casting (e.g., print sand casting). Additionally, the cage and/or the plug seat can be honed and/or superfinished to minimize or reduce friction and, in turn, wear encountered by the plug during operations.

Figure 1:
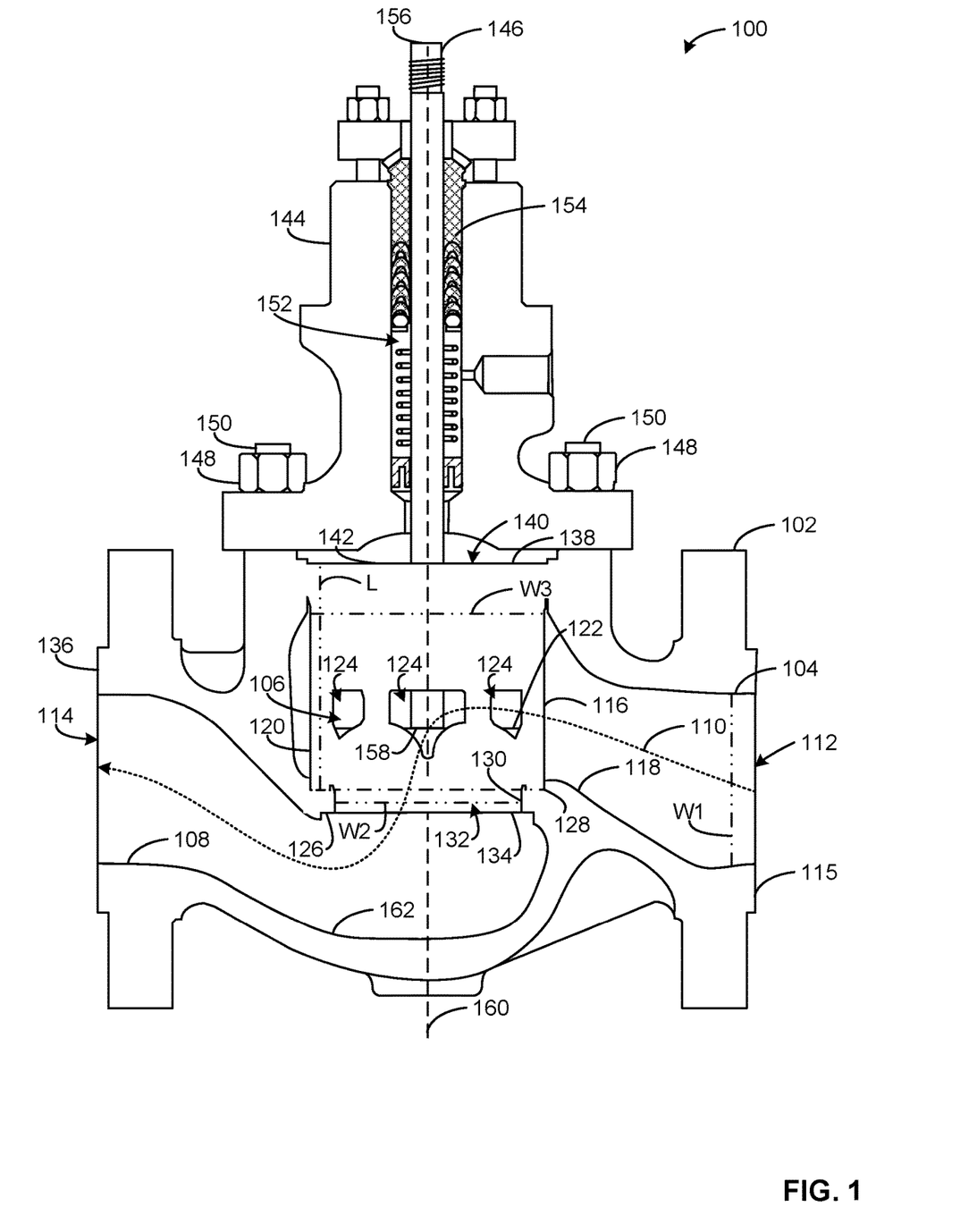
FIG. 1 is a cross-sectional view of an example control valve including a valve body in accordance with teachings of this disclosure.

FIG. 1 is a cross-sectional view of an example control valve 100 including an example valve body 102 in accordance with teachings of this disclosure. The control valve 100 can be associated with a process control system to provide flow control of an associated fluid. The valve body 102 of the illustrated example includes a first duct 104, a chamber 106, and a second duct 108. The first duct 104, the chamber 106, and the second duct 108 are fluidly coupled and define a passageway (e.g., a pathway, a flow path, etc.) 110 for fluid entering via an inlet 112 of the valve body 102 and exiting via an outlet 114 of the valve body 102, as represented in FIG. 1.

In the example of FIG. 1, the first duct 104 is defined between the inlet 112 on a first side 115 of the valve body 102 and a portion of a first wall 116 of the valve body 102. The first duct 104 is defined by surface(s) 118. As shown in FIG. 1, the surface 118 of the duct 104 intersects with a portion of the first wall 116. Put another way, at least a portion of the first wall 116 protrudes from (e.g., relative to) the surface 118. In some examples, at least a portion of a length L of the first wall 116 is greater than a width W1 of the first duct 104.

In the example of FIG. 1, the first wall 116 defines a cage 120 of the valve body 102. The cage 120 defines the chamber 106. The first wall 116 defines, for example, a cylindrical perimeter of the cage 120. However, the first wall 116 may define a perimeter of the cage 120 having a different shape (e.g., a rectangular shape). Also, although in the example of FIG. 1, the first wall 116 of the valve body 102 defines the cage 120, in other examples, the first wall 116 can define post(s) or other structure(s) to guide movements of a plug 122, as disclosed herein.

The first wall 116 includes one or more openings 124 (e.g., windows, apertures, etc.) defined therein to fluidly couple the first duct 104 to the chamber 106. The arrangement and/or orientation of the openings 124 in the first wall 116 impacts the flow characteristics of the fluid passing through the valve body 102 via the passageway 110. The size, shape, and/or placement of the openings 124 can differ from the example shown in FIG. 1.

In the illustrated example, the valve body 102 includes a second wall 126 that at least partially extends or protrudes from the first wall 116 proximate to a first end 128 of the first wall 116. In some examples, the first wall 116 and the second wall 126 are integrally formed (i.e., formed from the same portion of the valve body 102 via additive manufacturing, a mold, defined by cutting, etc.). In other examples, the first wall 116 and the second wall 126 can be created via additive manufacturing in which layers of materials are joined (e.g., fused) to define the first wall 116 and the second wall 126.

In the example of FIG. 1, the second wall 126 defines a seat 130 (e.g., a plug seat, a seat ring, etc.) of the valve body 102. As disclosed herein, the plug 122 selectively engages the seat 130 to control the flow of fluid through the chamber 106. The second wall 126 defines an opening 132 to fluidly couple the second duct 108 to the chamber 106. The opening 132 can have, for example, a circular shape. In some examples, a width W2 (e.g., diameter) of the opening 132 is less than a width W3 of the chamber 106 defined within the first wall 116. The opening 132 can have other shapes and/or sizes and/or be defined at other locations along the second wall 126.

As shown in FIG. 1, the second duct 108 is defined or formed in the valve body 102. The second duct 108 extends from an end 134 of the second wall 126 opposite the end 128 of the first wall 116 to a second side 136 of the valve body 102. The second duct 108 defines the outlet 114.

In the example of FIG. 1, a surface 138 (e.g., an external surface) of the valve body 102 includes an orifice 140 defined therein. In the illustrated example, a second end 142 of the first wall 116 opposite the first end 128 extends to and/or defines at least a portion of the surface 138. In the example of FIG. 1, the orifice 140 is aligned with the chamber 106 defined by the first wall 116 and, in turn, the opening 132 defined in the second wall 126.

In the example of FIG. 1, the formation of the seat 130 from the second wall 126 of the valve body 102 eliminates or substantially reduces the need for gasket(s) or other means for sealing gap(s) between the seat 130 and valve body 102 as compared to known examples in which the seat 130 is separately coupled to the valve body 102. Also, the formation of the cage 120 from the first wall 116 of the valve body 102 similarly eliminates or substantially reduces the need for gasket(s) between the cage 120 and the valve body 102 as compared to known examples in which the cage 120 is a separate component coupled to the valve body 102. Thus, the formation of the cage 120 and the seat 130 from the walls 116, 126 of the valve body 102 of FIG. 1 eliminates or substantially reduces potential pathways for fluid leakage in the valve body 102.

The example control valve 100 of FIG. 1 includes a bonnet 144 and a stem 146. The bonnet 144 is coupled to the valve body 102 via one or more mechanical fasteners. For example, in FIG. 1, the bonnet 144 is coupled to the valve body 102 via nuts 148 that receive bolts and/or threaded studs 150. The stem 146 passes through a cavity 152 defined in the bonnet 144. An example packing 154 (e.g., packing rings, etc.) is loaded and/or inserted in the cavity 152 of the bonnet 144. The packing 154 supports the stem 146 within the bonnet 144 and prevents process fluid from escaping through the cavity 152 between the stem 146 and the bonnet 144.

The stem 146 includes a first end 156 and a second end 158 opposite the first end 156. In some examples, the first end 156 of the stem 146 protrudes from the cavity 152 in a direction away from the valve body 102. The second end 158 of the stem 146 protrudes from the cavity 152 of the bonnet 144 and extends through the orifice 140 of the valve body 102 into the chamber 106 defined by the first wall 116 (i.e., the cage 120). The plug 122 is coupled to the second end 158 of the stem 146 and is disposed in the chamber 106 of the valve body 102. For example, the second end 158 of the stem 146 can be threaded and the plug 122 can be coupled to the stem 146 via a threaded bore of the plug 122.

When the bonnet 144 is coupled to the valve body 102, the stem 146 and the plug 122 are movable or slidable within the chamber 106 along a longitudinal axis 160 of the stem 146. For example, the first end 156 of the stem 146 can be coupled to an actuator (not shown) that moves the stem 146 along the longitudinal axis 160. The cage 120 surrounds the plug 122 to guide movements thereof along the longitudinal axis 160. As the plug 122 moves and/or slides past the openings 124 in the first wall 116, fluid passing through the valve body 102 is restricted and/or blocked. In particular, the plug 122 is configured to mate with the seat 130 to prevent (e.g., fully close off) fluid flow through the chamber 106 and, thus, the passageway 110. In some examples, at least a portion of the first wall 116 and/or at least a portion of the second wall 126 defining the seat 130 include a superfinished or honed surface to minimize or reduce friction between the wall(s) 116, 126 and the plug 122 during movement thereof.

Although the seat 130 of the illustrated example extends from the first end 128 of the first wall 116 (e.g., proximate a lower portion of the cage 120 when the valve body 102 is oriented as shown in FIG. 1), in other examples, the seat 130 can extend from the second end 142 of the first wall 116 (e.g., proximate to a top of the cage 120) when the orifice 140 is formed in an opposite side of the valve body 102. For instance, in examples in which the bonnet 144 is to be coupled to a surface of the valve body 102 opposite the surface 138, the first wall 116 can protrude relative to a surface 162 associated with the second duct 108 instead of the surface 118 associated with the first duct 104.

Figure 2:
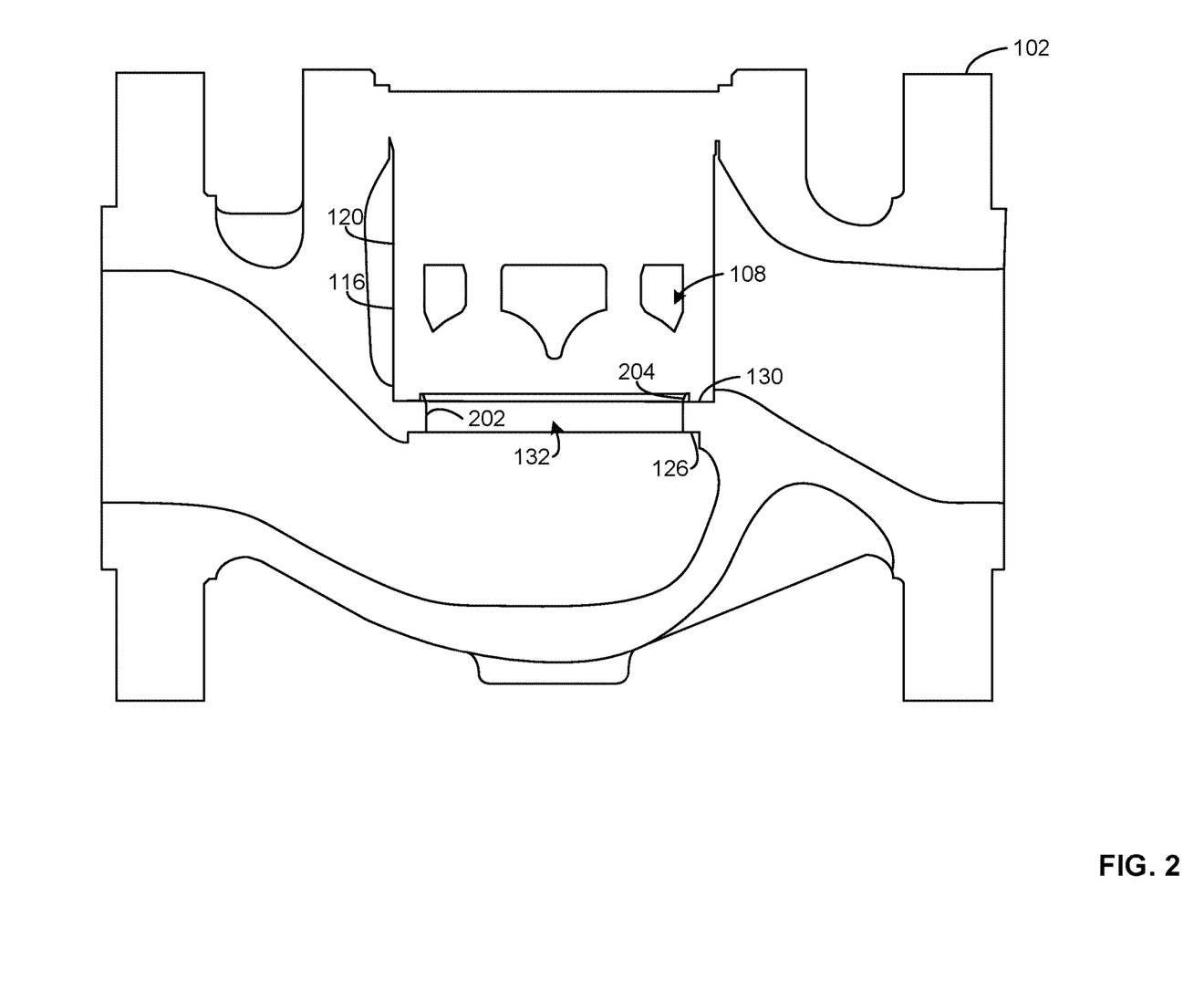
FIG. 2 is a cross-sectional view of the valve body of the example control valve of FIG. 1.

FIG. 2 is a cross-sectional view of the example valve body 102 of FIG. 1. The cross-sectional view of the illustrated example of FIG. 2 is taken approximately halfway through the cage 120. For illustrative purposes, the stem 146 and the plug 122 are not shown in FIG. 2.

As shown in FIG. 2, a body 202 of the seat 130 formed by the second wall 126 protrudes from at least a portion of the first wall 116. The opening 132 of the second wall 126 defines an annular perimeter of the body 202 of the seat 130.

In the illustrated example, the seat 130 includes a seating surface or protrusion 204 extending from the body 202 into the chamber 106 defined by the cage 120. The seating surface 204 is tapered (e.g., shaped) to receive and mate with the plug 122 (FIG. 1). As such, when the plug 122 is positioned against the seating surface 204, the plug 122 seals the chamber 106 and, thus, prevents fluid from passing therethrough. A shape, size, and/or location of the seating surface 204 can differ from the example shown in FIG. 2. In some examples, the seat 130 includes one or more seating surfaces 204. In other examples, the seating surface 204 extends about a perimeter of the seat 130.

Figure 3:
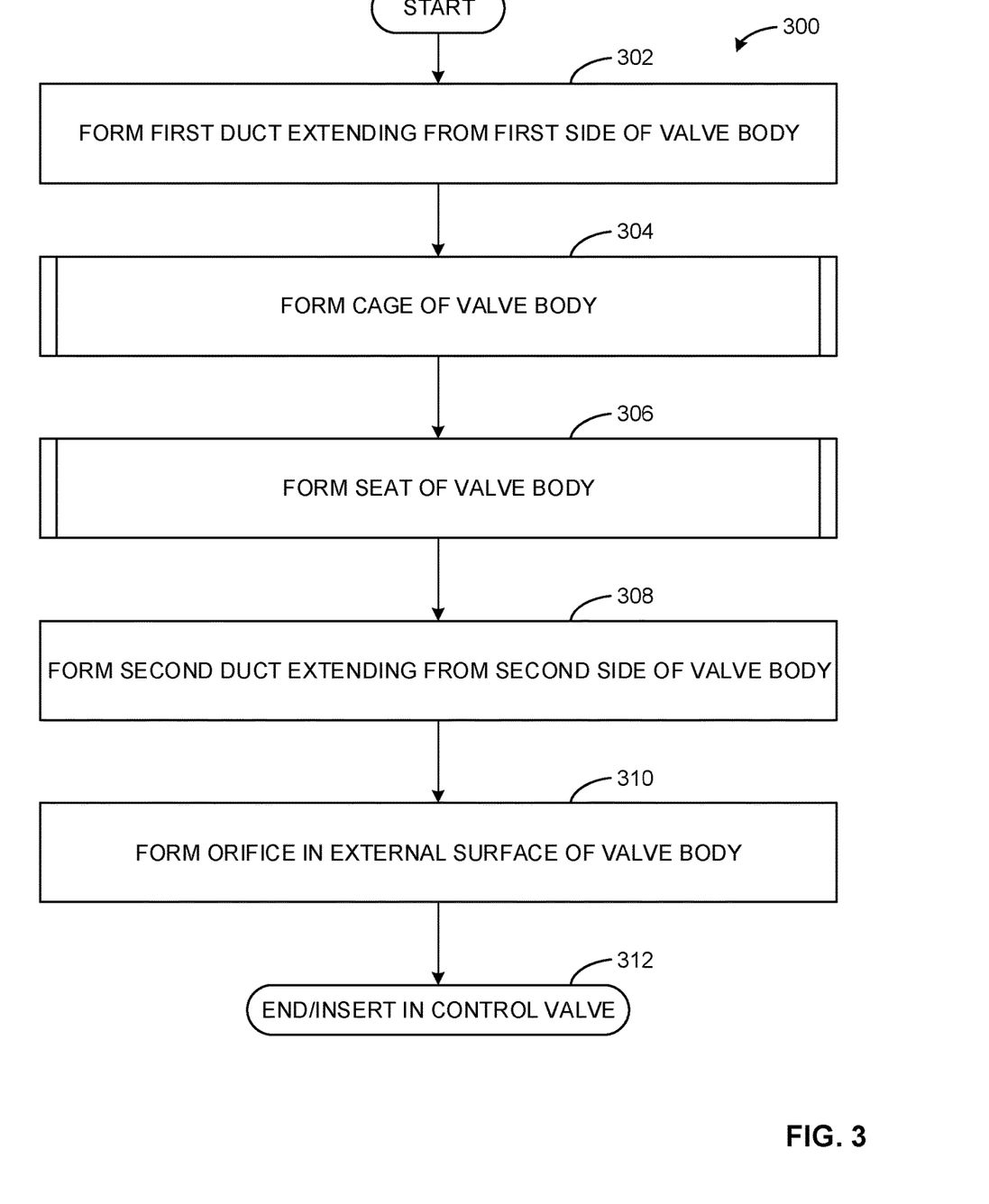
FIG. 3 is a flowchart of an example method to manufacture a valve body in accordance with teachings of this disclosure.

FIG. 3 is a flowchart of an example method 300 to manufacture a valve body of a control valve, such as the valve body 102 of FIGS. 1 and 2. The example method 300 can be performed using additive manufacturing, sand casting, machining, and/or other manufacturing processes to form the valve body 102 and/or one or more components thereof (e.g., the cage 120, the seat 130). In some examples, one or more blocks of the method 300 may additionally or alternatively be performed by producing a cast (e.g., a negative impression) that can be utilized to mold the valve body 102. The valve body 102 can be formed of, for example, carbon steel, stainless steel, and/or a nickel alloy (e.g., a high nickel alloy). The valve body 102 can additionally or alternatively be formed of other material(s).

The example method 300 of FIG. 3 begins at block 302, at which the first duct 104 of the valve body 102 is formed to extend from the first side 115 of the valve body 102. For example, additive manufacturing and/or sand casting can be used to form the surface(s) 118 that define the first duct 104. In some examples, forming the first duct 104 includes defining the inlet 112 at the first side 115 of the valve body 102.

At block 304, the cage 120 of the valve body 102 is formed. For example, additive manufacturing, sand casting, and/or machining can be used to form the cage 120 and/or the chamber 106 defined therein from the first wall 116 of the valve body 102. The chamber 106 is defined to be fluidly coupled to the first duct 104.

At block 306, the seat 130 of the valve body 102 is formed. For example, additive manufacturing, sand casting, and/or machining can be used to form the seat 130 from the second wall 126 of the valve body 102.

At block 308, the second duct 108 of the valve body 102 is formed to extend from the second side 136 of the valve body 102. For example, additive manufacturing and/or sand casting can be used to form the surface(s) 162 that define the second duct 108. The second duct 108 is fluidly coupled to the chamber 106 of the cage 120 and, in turn, the first duct 104 to define the fluid passageway 110. In some examples, forming the second duct 108 includes defining the outlet 114 in the second side 136 of the valve body 102.

At block 310, the orifice 140 is defined in the external surface 138 of the valve body 102. For example, extrusion can be used to define the orifice 140 in the surface 138 of the valve body. In some examples, the orifice 140 is shaped to have a circular perimeter. The orifice 140 can be defined to fluidly couple with the first duct 104. At block 312, the example method 300 ends and the valve body 102 can be assembled in the control valve 100 of FIG. 1 (e.g., coupled to the bonnet 144).

Figure 4:
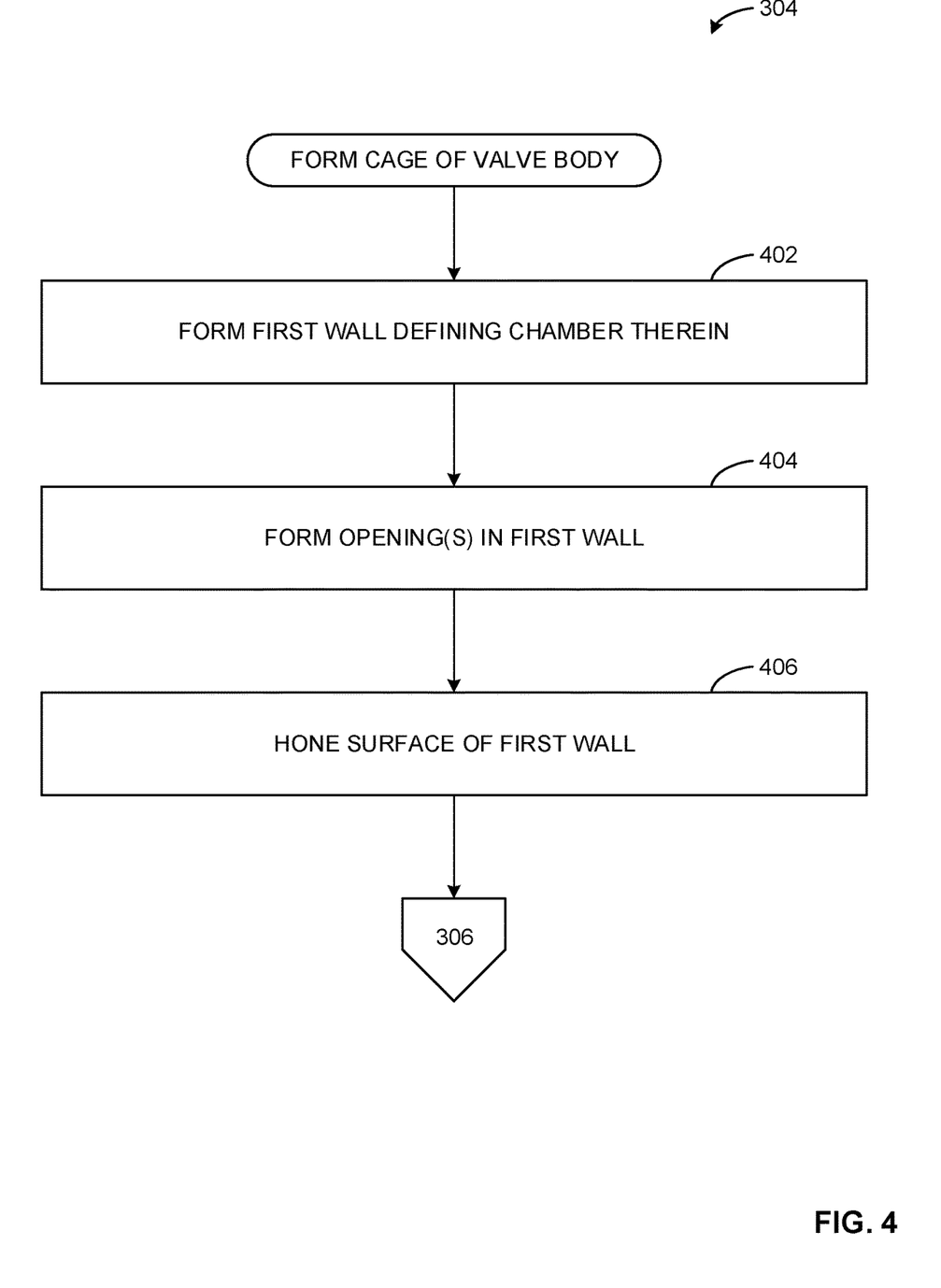
FIG. 4 is a flowchart of an example implementation of block 304 of the method of FIG. 3 to manufacture a cage of the valve body.

FIG. 4 is a flowchart representative of an example implementation of block 304 of the method 300 of FIG. 3 to form the cage 120 of the valve body 102 of FIGS. 1 and 2.

At block 402, the first wall 116 of the valve body 102 is formed, where the first wall defines the chamber 106. For example, additive manufacturing and/or sand casting can be used form the first wall 116 and, thus, define the chamber 106. In some examples, the first wall 116 is formed to have a cylindrical perimeter.

In some examples, the first wall 116 is formed to at least partially protrude from or relative to the surface 118 of the first duct 104. For example, an outer circumference of the first wall 116 can be formed to protrude from a portion of the surface 118 of the first duct 104 at a location where the first duct 104 meets the first wall 116. In some examples, the length L of the first wall 116 is greater than the width W1 of the first duct 104. In some examples, the first wall 116 is formed to extend to the surface 138 (e.g., the external surface) of the valve body 102. Accordingly, forming the first wall 116 can include defining a perimeter of the first wall 116 to align with the orifice 140 defined in the surface 138 of the valve body.

At block 404, one or more of the openings 124 are defined in the first wall 116. For example, additive manufacturing and/or sand casting can be used to define one or more of the openings 124 during construction of the first wall 116. In some examples, the openings 124 are spaced apart about the cylindrical perimeter of the first wall 116. In some examples, the openings 124 are shaped based on desired flow characteristics associated with the valve body 102.

At block 406, a surface of the first wall 116 that faces the chamber 106 is honed and/or superfinished. For example, a honing tool and/or an abrasive stone or tape can be used to hone and/or superfinish the surface of the first wall 116 to reduce a surface roughness thereof. The reduced surface roughness of the first wall 116 enables the plug 122 to slide along the surface with minimal or reduced friction and, in turn, wear over time. The example method of FIG. 4 continues to block 306 of FIG. 3.

Figure 5:
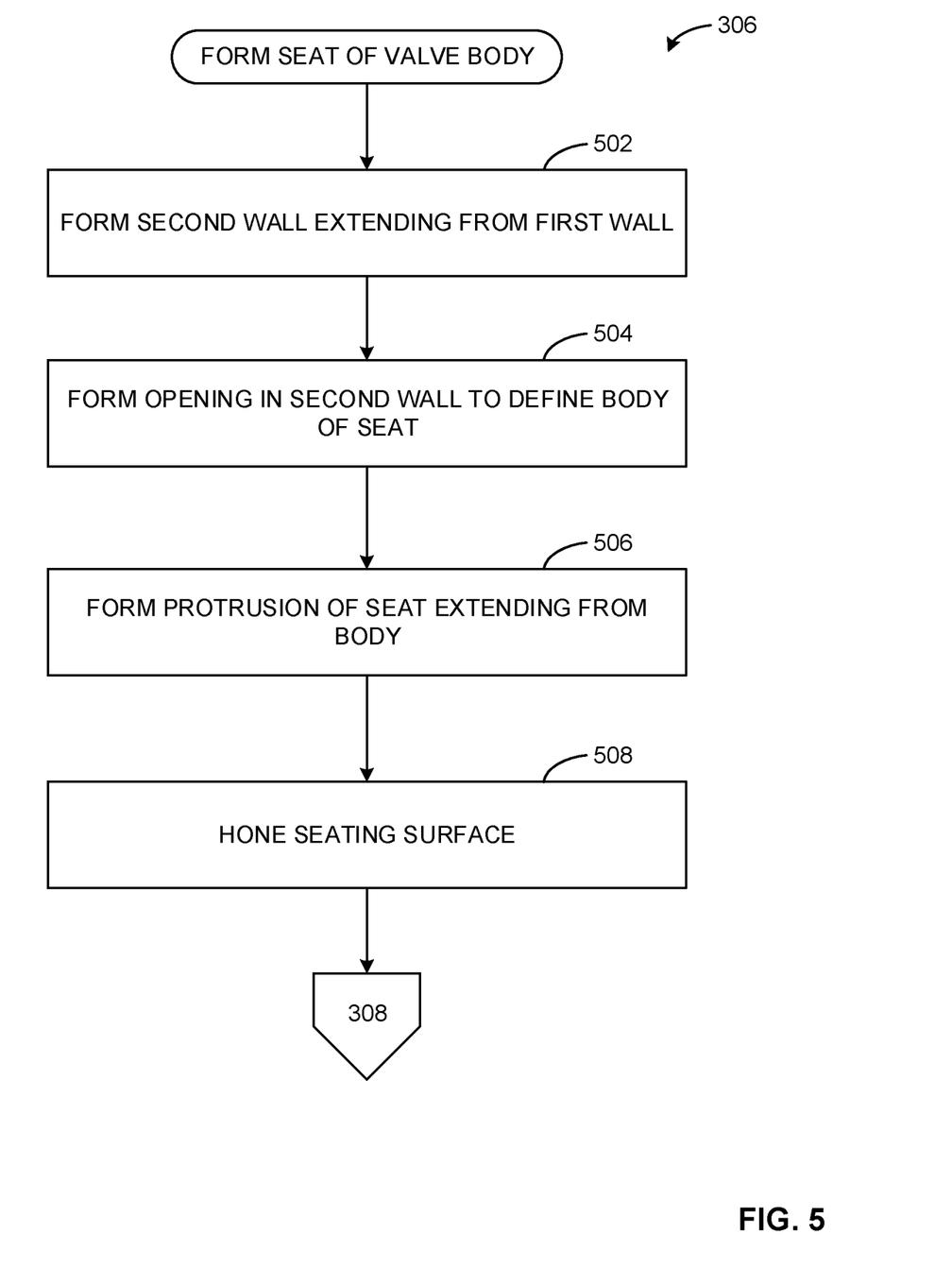
FIG. 5 is a flowchart of an example implementation of block 306 of the method of FIG. 3 to manufacture a seat of the valve body.

FIG. 5 is a flowchart representative of an example implementation of block 306 of the method 300 of FIG. 3 to manufacture the seat 130 of the valve body 102. At block 502, the second wall 126 of the valve body 102 is formed. For example, additive manufacturing and/or sand casting can form the second wall 126. In some examples, forming the second wall 126 includes constructing the second wall 126 to extend from a surface (e.g., an interior surface) of the first wall 116 at or near the first end 128 of the first wall 116.

At block 504, the opening 132 is formed in the second wall 126 and, thus, in turn, define the body 202 of the seat 130. In some examples, forming the opening 132 includes defining the width W2 (e.g., diameter) of the opening 132 to be smaller than the width W3 (e.g., diameter) of the chamber 106. Forming the opening 132 can include aligning a center of the opening 132 with the chamber 106.

At block 506, the protrusion (e.g., a seating surface) 204 of the seat 130 is formed. For example, additive manufacturing, sand casting, and/or machining can form the protrusion 204 of the seat 130. In some examples, forming the protrusion 204 of the seat 130 includes constructing the protrusion 204 to extend from the body 202 of the seat 130 toward the chamber 106 of the valve body 102. In some examples, forming the protrusion 204 includes tapering the protrusion 204 to enable the protrusion 204 to mate with a corresponding plug to be coupled to the valve body 102 (e.g., the plug 122 of FIG. 1). In some examples, the seating surface 204 at least partially faces an interior surface of the first wall 116.

At block 508, the seating surface 204 is honed. For example, a honing tool and/or an abrasive stone or tape can hone and/or superfinish the seating surface 204 of the protrusion 204 to reduce a surface roughness thereof. Accordingly, honing and/or superfinishing the seating surface 204 enables the plug 122 to slide against the seating surface 204 with minimal or reduced friction. The example method of FIG. 5 continues to block 308 of FIG. 3.

Although the example method 300 is described with reference to the flowcharts illustrated in FIGS. 3, 4, and/or 5, many other methods of manufacturing the example valve body 102 of FIGS. 1 and 2 may alternatively be used. For example, the order of execution of the blocks may be changed, and/or some of the blocks described may be changed, eliminated, or combined. Similarly, additional operations may be included in the manufacturing process before, in between, or after the blocks shown in FIGS. 3, 4, and/or 5.

From the foregoing, it will be appreciated that example methods, apparatus, systems, and articles of manufacture have been disclosed that provide example valve bodies having trim components (e.g., a cage, a seat) integrally formed from the valve body using manufacturing processes such as additive manufacturing. Example valve bodies disclosed herein include a first duct extending from a first side of the valve body and a second duct extending from a second side of the valve body. In examples disclosed herein, a first wall at least partially protrudes from a surface of the first duct and forms a chamber between the first duct and the second duct. As such, examples disclosed herein provide an integrally formed flow path in the valve body through the first duct, the chamber, and the second duct. In examples disclosed herein, a second wall protrudes from the first wall and defines a plug seat to receive a plug. In examples disclosed herein, surfaces of the first wall and the second wall are superfinished and/or honed to minimize or reduce friction encountered by the plug when the plug moves against the first or second wall. As such, examples disclosed herein minimize or reduce wear on the plug. Further, the integrally formed cage and/or seat of the example valve bodies disclosed herein minimizes or reduce parts that need to be replaced and/or repaired when a valve associated with the valve body undergoes maintenance.

Example methods, apparatus, systems, and articles of manufacture for valve bodies are disclosed herein. Further examples and combinations thereof include the following:

Example 1 includes a method of manufacturing a valve body, the method including forming a first duct extending from a first side of the valve body, forming a first wall in the valve body at least partially protruding from a surface of the first duct, the first wall defining a chamber, forming one or more openings in the first wall to fluidly couple the chamber to the first duct, and forming a second duct extending from a second side of the valve body opposite the first side, the second duct fluidly coupled to the chamber.

Example 2 includes the method of example 1, further including forming a second wall, the second wall at least partially protruding from the first wall.

Example 3 includes the method of example 2, wherein the forming of the second wall includes forming a body of a seat extending from the first wall, and forming a seating surface of the seat extending from the body, at least a portion of the seating surface extending into the chamber.

Example 4 includes the method of example 3, further including honing a surface of the seating surface.

Example 5 includes the method of example 1, wherein the first duct, the first wall, and the second duct are formed via sand casting.

Example 6 includes the method of example 1, wherein the first duct, the first wall, and the second duct are formed via additive manufacturing.

Example 7 includes the method of example 1, further including honing an interior surface of the first wall.

Example 8 includes the method of example 1, further including forming an orifice in an exterior surface of the valve body, wherein forming the first wall includes aligning the chamber and the orifice.

Example 9 includes a valve body including a first duct extending from a first side of the valve body to a first wall, the first wall at least partially protruding relative to a surface of the first duct, a second duct extending from a second side of the valve body opposite the first side, and a cage defining a chamber between the first duct and the second duct, the cage including the first wall and a second wall protruding from the first wall, the first wall including a first opening to fluidly coupled the chamber to the first duct, the second wall including a second opening to fluidly couple the chamber to the first duct and the second duct.

Example 10 includes the valve body of example 9, wherein the second wall includes a plug seat.

Example 11 includes the valve body of example 10, wherein the plug seat includes a body defined by the second wall, and a protrusion extending from the body at least partially into the chamber.

Example 12 includes the valve body of example 11, wherein the protrusion includes a honed surface at least partially facing a third opening defined in an exterior surface of the valve body.

Example 13 includes the valve body of example 12, wherein the honed surface at least partially faces an interior surface of the first wall.

Example 14 includes the valve body of example 9, wherein the cage includes a honed surface.

Example 15 includes the valve body of example 9, wherein the cage extends to a surface of the valve body, the surface defining an orifice therein to receive a plug removably couplable to the valve body, the orifice aligned with the chamber.

Example 16 includes a method of manufacturing a valve body, the method including forming a cage within a passageway defined in the valve body, the cage defining a first portion of the passageway in fluid connection with a second portion of the passageway and a third portion of the passageway, the cage including a wall protruding from a surface defining the second portion of the passageway, and forming a plug seat protruding from the wall.

Example 17 includes the method of example 16, wherein the forming of the plug seat includes forming a first portion of the plug seat to extend from a first end of the wall, and forming a second portion of the plug seat to extend from the first portion of the plug seat toward a second end of the wall opposite the first end.

Example 18 includes the method of example 16, further including honing a surface of the cage, and honing a surface of the plug seat.

Example 19 includes the method of example 16, wherein the cage extends to an exterior surface of the valve body, the exterior surface including an orifice defined therein, and further including aligning an opening of the cage with the orifice.

Example 20 includes the method of example 19, further including forming one or more windows in the wall of the cage.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method of manufacturing a valve body, the method comprising:
    forming a first duct extending from a first side of the valve body;

forming a first wall in the valve body at least partially protruding from a surface of the first duct, the first wall defining a chamber;

forming one or more openings in the first wall to fluidly couple the chamber to the first duct;

forming a second duct extending from a second side of the valve body opposite the first side, the second duct fluidly coupled to the chamber;

forming a seat body of a seat extending from the first wall at a first end of the chamber; and forming a seating surface of the seat protruding from the seat body into the chamber toward a second end of the chamber opposite the first end of the chamber, the seating surface separated from the first wall by a portion of the seat body, the forming of the seating surface including tapering the seating surface to at least partially face an inner surface of the first wall.

2. The method of claim 1, further including honing the seating surface.

3. The method of claim 1, wherein the first duct, the first wall, and the second duct are formed via sand casting.

4. The method of claim 1, wherein the first duct, the first wall, and the second duct are formed via additive manufacturing.

5. The method of claim 1, further including honing the inner surface of the first wall that faces the chamber.

6. The method of claim 1, further including forming an orifice in an exterior surface of the valve body, wherein forming the first wall includes aligning the chamber and the orifice.

7. The method of claim 1, wherein the seating surface is formed via machining.

8. The method of claim 1, further including superfinishing the seating surface.

9. The method of claim 1, wherein forming the seat body includes forming an opening at the first end of the chamber that has a smaller width than a width defined by the chamber.

10. The method of claim 9, wherein forming the opening at the first end of the chamber includes aligning a center of the opening with the chamber.

11. The method of claim 1, wherein forming the first wall includes defining a length of the first wall to be greater than a width of the first duct.

12. The method of claim 1, wherein forming the first wall includes forming the first wall with a same material as a material defining the first duct.

13. A method of manufacturing a valve body, the method comprising:

forming a first duct extending from a first side of the valve body;

forming a first wall in the valve body at least partially protruding from a surface of the first duct, an inner surface of the first wall defining a perimeter of a chamber;

forming one or more openings in the first wall to fluidly couple the chamber to the first duct;

forming a second duct extending from a second side of the valve body opposite the first side, the second duct fluidly coupled to the chamber;

forming a seat body of a seat extending from the first wall; and forming a seating surface of the seat extending from the seat body upwards into the chamber, the seating surface and at least a portion of the seat body disposed within the perimeter of the chamber, the seating surface separated from the first wall by the at least the portion of the seat body, the forming of the seating surface including tapering the seating surface to at least partially face the inner surface of the first wall.

* * * * *